United States Patent
Chen et al.

(10) Patent No.: US 10,848,055 B2
(45) Date of Patent: Nov. 24, 2020

(54) TRANSMITTING/RECEIVING COMMAND METHOD APPLIED BETWEEN A MASTER CONTROLLER AND A SLAVE CONTROLLER OF A POWER CONVERTER

(71) Applicant: Leadtrend Technology Corp., Hsinchu County (TW)

(72) Inventors: Yao-Tsung Chen, Hsinchu County (TW); Kuan-Hsien Chou, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/594,058

(22) Filed: Oct. 6, 2019

(65) Prior Publication Data

US 2020/0336062 A1 Oct. 22, 2020

(30) Foreign Application Priority Data

Apr. 19, 2019 (TW) .............................. 108113697 A

(51) Int. Cl.
*H02M 1/42* (2007.01)
*H02M 1/38* (2007.01)
*H02M 1/096* (2006.01)
*H02M 1/00* (2006.01)

(52) U.S. Cl.
CPC ............ *H02M 1/42* (2013.01); *H02M 1/096* (2013.01); *H02M 1/38* (2013.01); *H02M 1/4208* (2013.01); *H02M 2001/0025* (2013.01); *H02M 2001/385* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 1/12; H02M 1/42; H02M 1/4225; H02M 1/4233; H02M 1/4241; H02M 1/4258; H02M 1/425; H02M 1/4208; H02M 2001/4283; H02M 2001/4291; H02M 2003/1552; H02M 3/155; H02M 3/145; H02M 3/158; H02M 3/1588; H02M 3/156

See application file for complete search history.

(56) References Cited

U.S. PATENT DOCUMENTS

2014/0365792 A1* 12/2014 Yun .................... H02J 7/00036
                                                    713/320
2019/0129369 A1* 5/2019 Song .................... G01R 31/396

* cited by examiner

*Primary Examiner* — Bryan R Perez
(74) *Attorney, Agent, or Firm* — Winston Hsu

(57) ABSTRACT

A transmitting/receiving command method applied between a master controller and a slave controller of a power converter includes enabling the master controller and the slave controller; a controller of the master controller and the slave controller detecting a node voltage of a pin of the controller; the controller transmitting a first command of a plurality of first commands to another controller of the master controller and the slave controller through the pin when the node voltage is less than a predetermined voltage, wherein the predetermined voltage corresponds to over temperature protection of the power converter; and the controller detecting the node voltage again after the controller receives a first return signal transmitted by the another controller.

12 Claims, 6 Drawing Sheets

TRANSMITTING/RECEIVING COMMAND METHOD APPLIED BETWEEN A MASTER CONTROLLER AND A SLAVE CONTROLLER OF A POWER CONVERTER

BACKGROUND OF THE INVENTION

1. Field of the Invention

The present invention relates to a transmitting/receiving command method applied to a power converter, and particularly to a transmitting/receiving command method that is applied between a master controller and a slave controller of a power converter.

2. Description of the Prior Art

In the prior art, because a design trend of a power converter applied to a television gradually adopts a design without flyback standby, the power converter is only composed of a pulse width modulation (PWM) stage circuit and a power factor correction (PFC) stage circuit. Therefore, the power converter needs to be controlled by a master controller and a slave controller, wherein the master controller controls the pulse width modulation stage circuit and the slave controller controls the power factor correction stage circuit, and the master controller and the slave controller are separated from each other.

Because the master controller and the slave controller are separated from each other, a well-operating transmitting/receiving command method is required between the master controller and the slave controller to make the pulse width modulation stage circuit and the power factor correction stage circuit cooperate well. However, the prior art only provide a transmitting/receiving command method having limited function, so how to provide a transmitting/receiving command method that not only operates easily but also covers multiple commands becomes an important issue of the design trend of the power converter.

SUMMARY OF THE INVENTION

An embodiment of the present invention provides a transmitting/receiving command method applied between a master controller and a slave controller of a power converter. The transmitting/receiving command method includes enabling the master controller and the slave controller; a controller of the master controller and the slave controller detecting a node voltage of a pin of the controller; the controller transmitting a first command of a plurality of first commands to another controller of the master controller and the slave controller through the pin when the node voltage is less than a predetermined voltage, wherein the predetermined voltage corresponds to over temperature protection (OTP) of the power converter; and the controller detecting the node voltage again after the controller receives a first return signal transmitted by the another controller.

An embodiment of the present invention provides a transmitting/receiving command method applied between a master controller and a slave controller of a power converter. The transmitting/receiving command method includes enabling the master controller and the slave controller; a controller of the master controller and the slave controller detecting a node voltage of a pin of the controller; the controller transmitting a first command of a plurality of first commands to another controller of the master controller and the slave controller through the pin when the node voltage is less than a predetermined voltage, wherein each first command of the plurality of first commands corresponds to a predetermined voltage range; and the controller detecting the node voltage again after the controller receives a first return signal transmitted by the another controller.

The present invention provides a transmitting/receiving command method. The transmitting/receiving command method makes each command of a plurality of commands transmitted between a master controller and a slave controller correspond to a predetermined voltage range, and a pin of the master controller for transmitting the plurality of commands corresponds to at least one predetermined function (e.g. over temperature protection). Therefore, compared to the prior art, the transmitting/receiving command method simultaneously has advantages of operating easily, covering multiple commands, and the master controller and the slave controller not needing additional pin to execute the transmitting/receiving command method.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
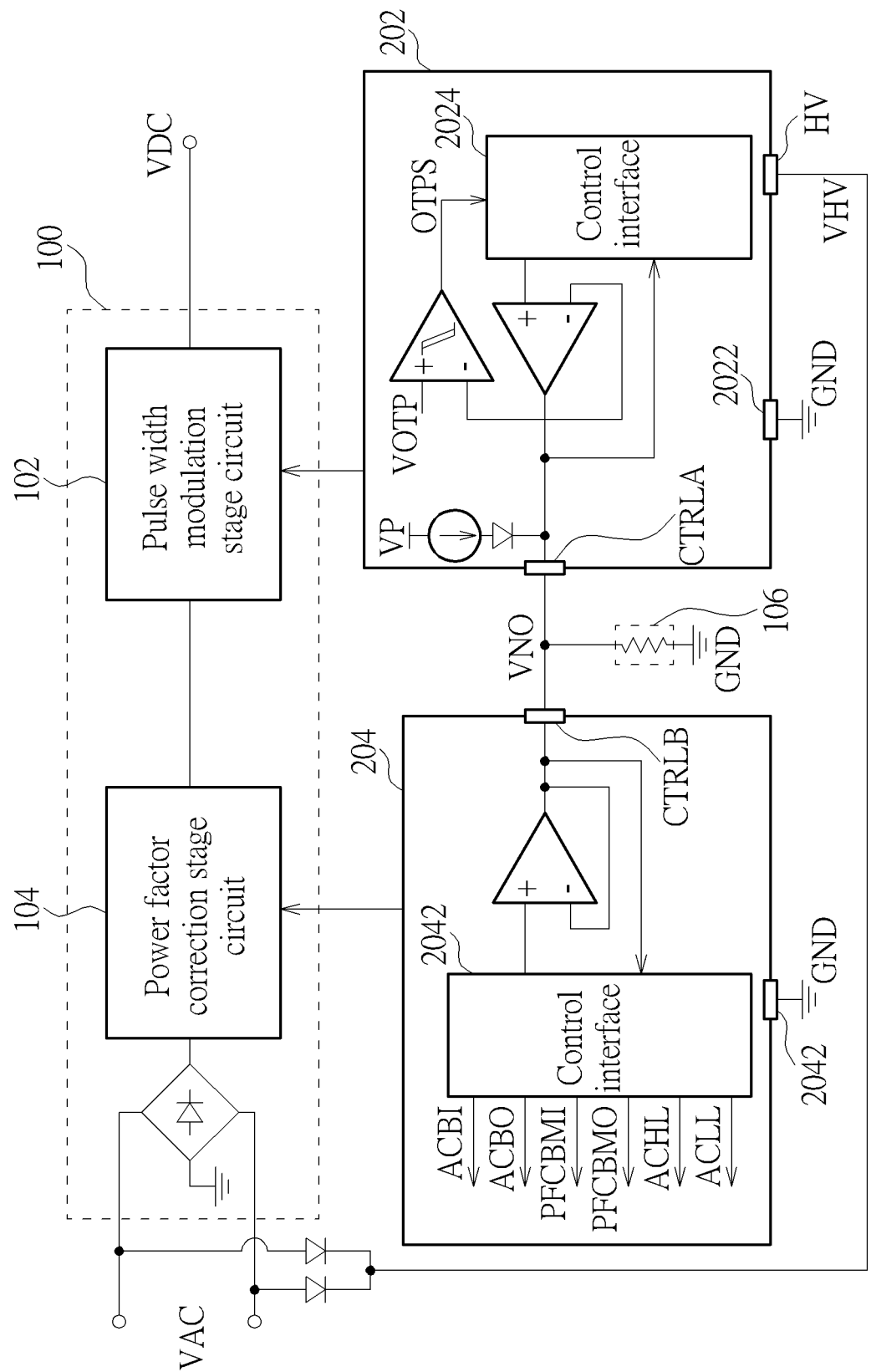
FIG. 1 is a diagram illustrating a master controller and a slave controller applied to a power converter according to a first embodiment of the present invention.

Please refer to FIG. 1. FIG. 1 is a diagram illustrating a master controller 202 and a slave controller 204 applied to a power converter 100 according to a first embodiment of the present invention. As shown in FIG. 1, the power converter 100 includes a pulse width modulation (PWM) stage circuit 102 and a power factor correction (PFC) stage circuit 104, wherein the pulse width modulation stage circuit 102 can be a flyback circuit or an inductor-inductor-capacitor resonant circuit (LLC resonant circuit), the pulse width modulation stage circuit 102 is used for converting an alternating voltage (AC voltage) VAC into a direct voltage (DC voltage) VDC, and the power factor correction stage circuit 104 is used for increasing conversion efficiency of the power converter 100. In addition, the pulse width modulation stage circuit 102 and the power factor correction stage circuit 104 are well-known to one of ordinary skill in the art, so further description thereof is omitted for simplicity. In addition, as shown in FIG. 1, the master controller 202 is used for controlling the pulse width modulation stage circuit 102, the slave controller 204 is used for controlling the power factor correction stage circuit 104, and the master controller 202 and the slave controller 204 utilize a pin CTRLA and a pin CTRLB to communicate with each other, respectively. In addition, for simplifying FIG. 1, FIG. 1 neglects other pins of the master controller 202 except the pin CTRLA, a pin 2022 coupled to ground GND, and a pin HV, and also neglects other pins of the slave controller 204 except the pin CTRLB and a pin 2042 coupled to the ground GND.

Figure 2:
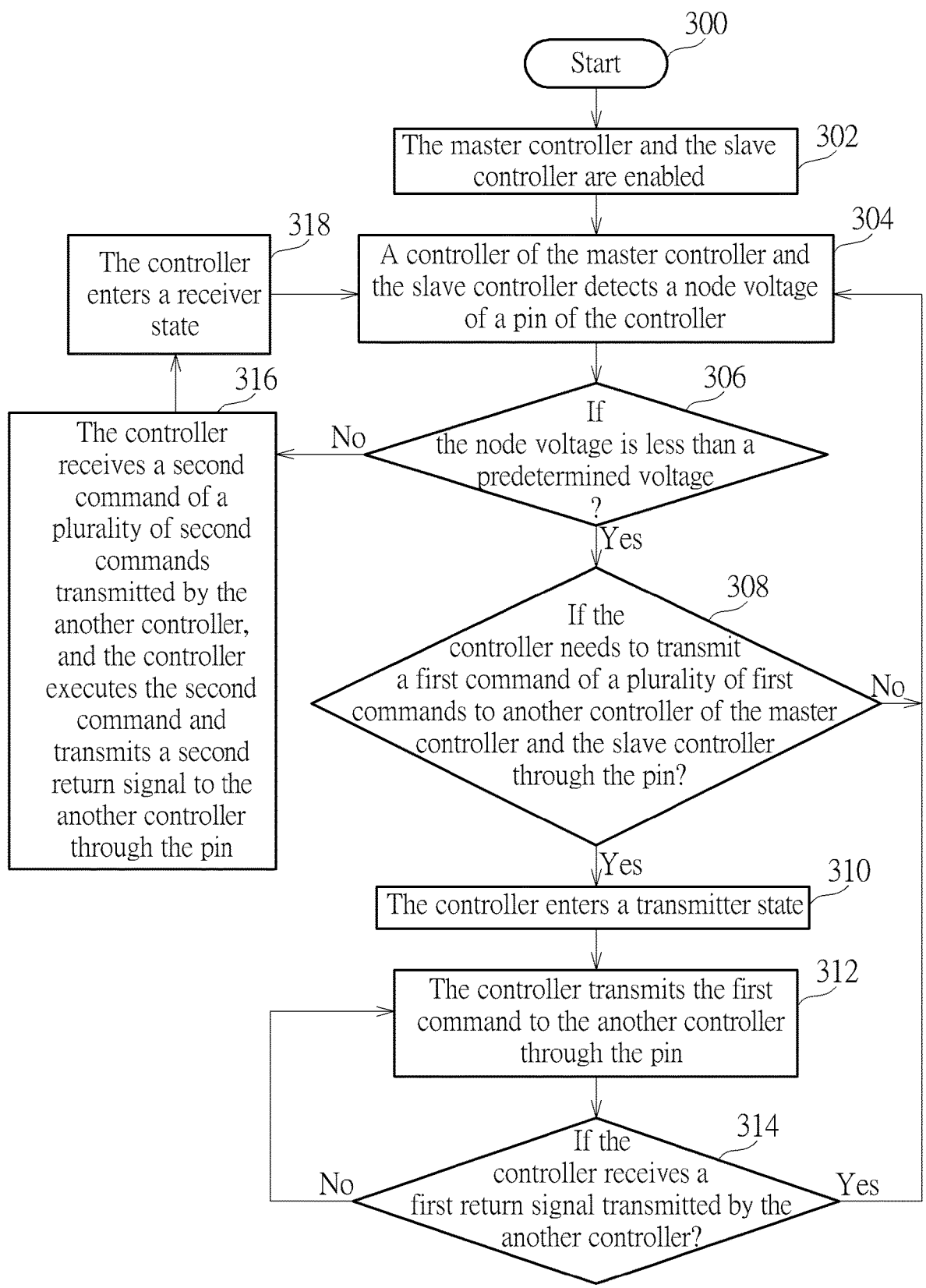
FIG. 2 is a flowchart illustrating a transmitting/receiving command method applied between a master controller and a slave controller of a power converter according to a second embodiment of the present invention.

Please refer to FIG. 2. FIG. 2 is a flowchart illustrating a transmitting/receiving command method applied between a master controller and a slave controller of a power converter according to a second embodiment of the present invention. The transmitting/receiving command method in FIG. 2 is illustrated using the power converter 100, the master controller 202, and the slave controller 204 in FIG. 1. Detailed steps are as follows:

Step 300: Start.

Step 302: The master controller 202 and the slave controller 204 are enabled.

Step 304: A controller of the master controller 202 and the slave controller 204 detects a node voltage VNO of a pin of the controller.

Step 306: If the node voltage VNO is less than a predetermined voltage VP; if yes, go to Step 308; if no, go to Step 316.

Step 308: If the controller needs to transmit a first command of a plurality of first commands to another controller of the master controller 202 and the slave controller 204 through the pin; if yes, go to Step 310; if no, go to Step 304.

Step 310: The controller enters a transmitter state.

Step 312: The controller transmits the first command to the another controller through the pin.

Step 314: If the controller receives a first return signal transmitted by the another controller; if yes, go to Step 304; if no, go to Step 312.

Step 316: The controller enters a receiver state.

Step 318: The controller receives a second command of a plurality of second commands transmitted by the another controller, and the controller executes the second command and transmits a second return signal to the another controller through the pin, go to Step 304.

First, take the controller as the master controller 202 and the another controller as the slave controller 204 as an example, and detailed descriptions are as follows:

In Step 302, after an AC source (not shown in FIG. 1) starts to provide the AC voltage VAC, when a DC voltage VHV of the pin HV is greater than an AC brown-in voltage VACBNI, the master controller 202 can be first enabled. As shown in FIG. 1, because the node voltage VNO can be determined by the predetermined voltage VP and a thermistor 106 (having a negative temperature coefficient), the node voltage VNO should be less than the predetermined voltage VP (wherein in one embodiment of the present invention, the predetermined voltage VP can be 1.5V). In Step 304, the master controller 202 first detects the node voltage VNO of the pin CTRLA and determines whether to execute over temperature protection (OTP) on the power converter 100, wherein because the node voltage VNO corresponds to the predetermined voltage VP, the predetermined voltage VP also corresponds to the over temperature protection. Therefore, when the node voltage VNO is less than an over temperature protection reference voltage VOTP (wherein the over temperature protection reference voltage VOTP is less than the predetermined voltage VP, for example, the over temperature protection reference voltage VOTP is 0.9V), the master controller 202 will generate an over temperature protection signal OTPS to a control interface 2024 of the master controller 202. Meanwhile, the control interface 2024 will transmit the over temperature protection signal OTPS to an over temperature protection circuit of the master controller 202 corresponding to the over temperature protection, and the over temperature protection circuit will execute the over temperature protection on the power converter 100 accordingly. In addition, when the node voltage VNO is between the predetermined voltage VP and the over temperature protection reference voltage VOTP, the master controller 202 does not generate the over temperature protection signal OTPS to the control interface 2024 of the master controller 202. In addition, because the over temperature protection circuit is not main technical feature of the present invention, so further description thereof is omitted for simplicity. In Step 306, after the master controller 202 does not execute the over temperature protection on the power converter 100, the master controller 202 can detect if the node voltage VNO is also less than the predetermined voltage VP, wherein when no command is transmitted between the master controller 202 and the slave controller 204, the node voltage VNO is less than the predetermined voltage VP. In Step 308, when the node voltage VNO is less than the predetermined voltage VP, but the master controller 202 does not need to transmit the first command to the slave controller 204, the master controller 202 can execute Step 304 again to continuously detect the node voltage VNO. In Step 310, when the node voltage VNO is less than the predetermined voltage VP and the master controller 202 needs to transmit the first command to the slave controller 204, the master controller 202 will enter the transmitter state. Meanwhile, the slave controller 204 enters the receiver state, and the node voltage VNO will be correspondingly increased with the first command. In Step 314, after the slave controller 204 receives and executes the first command, the slave controller 204 should transmit the first return signal to the master controller 202 through the pin CTRLB, wherein the first return signal corresponds to the first command. Therefore, when the master controller 202 fails to receive the first return signal, the master controller 202 can execute Step 312 again to transmit the first command to the slave controller 204; and when the master controller 202 receives the first return signal, the master controller 202 can execute Step 304 again to continuously detect the node voltage VNO. In addition, in Step 316, when the node voltage VNO is greater than the predetermined voltage VP, it means that the slave controller 204 transmits the second command to the master controller 202, so meanwhile the slave controller 204 enters the transmitter state and the master controller 202 enters the receiver state, and the node voltage VNO is also correspondingly increased with the second command. In Step 318, the master controller 202 receives the second command transmitted by the slave controller 204, and the master controller 202 executes the second command and transmits the second return signal to the slave controller 204 through the pin CTRLA, wherein the second return signal corresponds to the second command. In addition, after the master controller 202 executes the second command and transmits the second return signal to the slave controller 204 through the pin CTRLA, the master controller 202 can execute Step 304 again to continuously detect the node voltage VNO.

Figure 3:
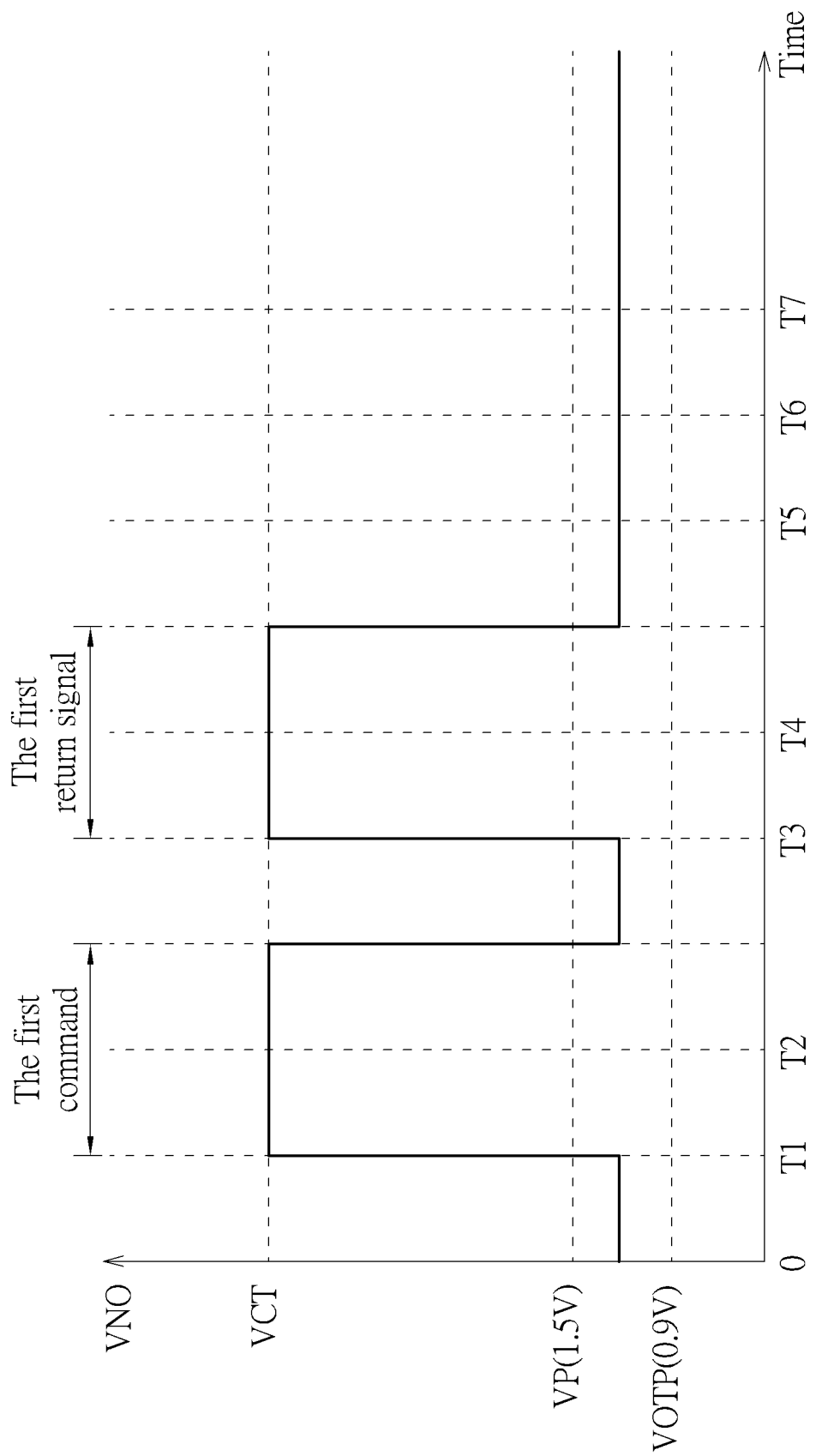
FIG. 3 is a timing diagram illustrating the transmitting/receiving command method between the master controller and the slave controller.

In addition, please refer to FIG. 3. FIG. 3 is a timing diagram illustrating the transmitting/receiving command method between the master controller 202 and the slave controller 204, wherein FIG. 3 takes the controller as the master controller 202 and the another controller as the slave controller 204 as an example. As shown in FIG. 3, at a time T1, when the node voltage VNO is between the predetermined voltage VP and the over temperature protection reference voltage VOTP (meanwhile, it means that no command is transmitted between the master controller 202 and the slave controller 204, and the master controller 202 does not execute the over temperature protection on the power converter 100), the master controller 202 can transmit the first command to the slave controller 204, wherein the master controller 202 enters the transmitter state, the slave controller 204 enters the receiver state, the node voltage VNO will be correspondingly increased with the first command to a corresponding voltage VCT (e.g. when the first command is an AC high line command ACHL, the corresponding voltage VCT is between 4.2V and 4.7V), and enabling time of the first command is 120 μs. But, the present invention is not limited to the enabling time of the first command being 120 μs. After the slave controller 204 receives the first command for 60 μs, the slave controller 204 starts to execute the first command (at a time T2). In addition, as shown in FIG. 3, at a time T3, after the slave controller 204 executes the first command for 120 μs, the slave controller 204 transmits the first return signal to the master controller 202, wherein enabling time of the first return signal is 120 μs. But, the present invention is not limited to the enabling time of the first return signal being 120 μs. In addition, because the first return signal corresponds to the first command, the node voltage VNO will be also correspondingly increased with the first return signal to the corresponding voltage VCT during the enabling time of the first return signal. In addition, as shown in FIG. 3, when the master controller 202 does not receive the first return signal yet after the master controller 202 transmits the first command to the slave controller 204 for 240 μs (at a time T5), the master controller 202 can transmit the first command to the slave controller 204 again at the time T5. As shown in FIG. 3, after the enabling time of the first return signal is completed for 120 μs (at a time T6), if no command is transmitted between the master controller 202 and the slave controller 204 and the slave controller 204 needs to transmit the second command to the master controller 202, the slave controller 204 can enter the transmitter state to transmit the second command to the master controller 202. In addition, as shown in FIG. 3, after the master controller 202 starts to receive the first return signal for 300 μs (at a time T7), if no command is transmitted between the master controller 202 and the slave controller 204 and the master controller 202 needs to transmit the first command or another first command to the slave controller 204, the master controller 202 can enter the transmitter state again to transmit the first command or the another first command to the slave controller 204. In addition, the present invention is not limited timings of the transmitting/receiving command method between the master controller 202 and the slave controller 204 shown in FIG. 3. That is to say, any configuration in which each command of the plurality of first commands and the plurality of second commands corresponds to a predetermined voltage range and the master controller 202 can execute at least one predetermined function (e.g. the over temperature protection) through the pin CTRLA falls within the scope of the present invention. In addition, a length of the enabling time of the first command can be equal to or different from a length of the enabling time of the first return signal.

In addition, each command of the plurality of first commands and the plurality of second commands corresponds to a predetermined voltage range. For example, when the plurality of first commands are an AC brown-in command ACBI, an AC brown-out command ACBO, a PFC burst mode in command PFCBMI, a PFC burst mode out command PFCBMO, an AC low line command ACLL, and the AC high line command ACHL, the AC brown-in command ACBI, the AC brown-out command ACBO, the PFC burst mode in command PFCBMI, the PFC burst mode out command PFCBMO, the AC low line command ACLL, and the AC high line command ACHL correspond to 1.7V~2.2V, 2.2V~2.7V, 2.7V~3.2V, 3.2V~3.7V, 3.7V~4.2V, 4.2V~4.7V respectively, wherein the AC brown-in command ACBI, the AC brown-out command ACBO, the PFC burst mode in command PFCBMI, the PFC burst mode out command PFCBMO, the AC low line command ACLL, and the AC high line command ACHL are transmitted to the slave controller 204 through the control interface 2024 and the pin CTRLA of the master controller 202. Therefore, after the control interface 2042 of the slave controller 204 receives the AC brown-in command ACBI, the AC brown-out command ACBO, the AC low line command ACLL, and the AC high line command ACHL through the pin CTRLB, the control interface 2042 will transmit the AC brown-in command ACBI, the AC brown-out command ACBO, the AC low line command ACLL, and the AC high line command ACHL to corresponding circuits of the control interface 2042. In addition, the present invention is not limited to the plurality of first commands being the AC brown-in command ACBI, the AC brown-out command ACBO, the PFC burst mode in command PFCBMI, the PFC burst mode out command PFCBMO, the AC low line command ACLL, and the AC high line command ACHL, and is also not limited to the above-mentioned predetermined voltage ranges corresponding to the AC brown-in command ACBI, the AC brown-out command ACBO, the PFC burst mode in command PFCBMI, the PFC burst mode out command PFCBMO, the AC low line command ACLL, and the AC high line command ACHL. In addition, principles of the plurality of second commands can be referred to the above-mentioned descriptions of the plurality of first commands, so further description thereof is omitted for simplicity.

In addition, in another embodiment of the present invention, FIG. 2 can also take the controller as the slave controller 204 and the another controller as the master controller 202 as an example, and detailed descriptions are as follows:

In Step 302, the slave controller 204 is enabled. In addition, because the over temperature protection is executed by the master controller 202, the slave controller 204 will neglect Step 304 to directly execute Step 306. In Step 306, after the master controller 202 does not execute the over temperature protection on the power converter 100, the slave controller 204 can detect whether the node voltage VNO is also less than the predetermined voltage VP, wherein when no command is transmitted between the master controller 202 and the slave controller 204, the node voltage VNO is less than the predetermined voltage VP. In Step 308, when the node voltage VNO is less than the predetermined voltage VP, but the slave controller 204 does not need to transmit the first command to the master controller 202, the slave controller 204 can execute Step 306 again to continuously detect the node voltage VNO. In Step 310, when the node voltage VNO is less than the predetermined voltage VP and the slave controller 204 needs to transmit the first command to the master controller 202, the slave controller 204 enters the transmitter state. Meanwhile, the master controller 202 enters the receiver state, and the node voltage VNO will be correspondingly increased with the first command. In Step 314, after the master controller 202 receives and executes the first command, the master controller 202 should transmit the first return signal to the slave controller 204 through the pin CTRLA. Therefore, when the slave controller 204 fails to receive the first return signal, the slave controller 204 can execute Step 312 again to transmit the first command to the master controller 202, and when the slave controller 204 receives the first return signal, the slave controller 204 can execute Step 306 again to continuously detect the node voltage VNO. In addition, in Step 316, when the node voltage VNO is greater than the predetermined voltage VP, it means that the master controller 202 transmits the second command to the slave controller 204, so meanwhile the master controller 202 enters the transmitter state, the slave controller 204 enters the receiver state, and the node voltage VNO is also correspondingly increased with the second command. In Step 318, the slave controller 204 receives the second command transmitted by the master controller 202, and the slave controller 204 executes the second command and transmits the second return signal to the master controller 202 through the pin CTRLB. In addition, after the slave controller 204 executes the second command and transmits the second return signal to the master controller 202 through the pin CTRLB, the slave controller 204 can execute Step 306 again to continuously detect the node voltage VNO.

Figure 4:
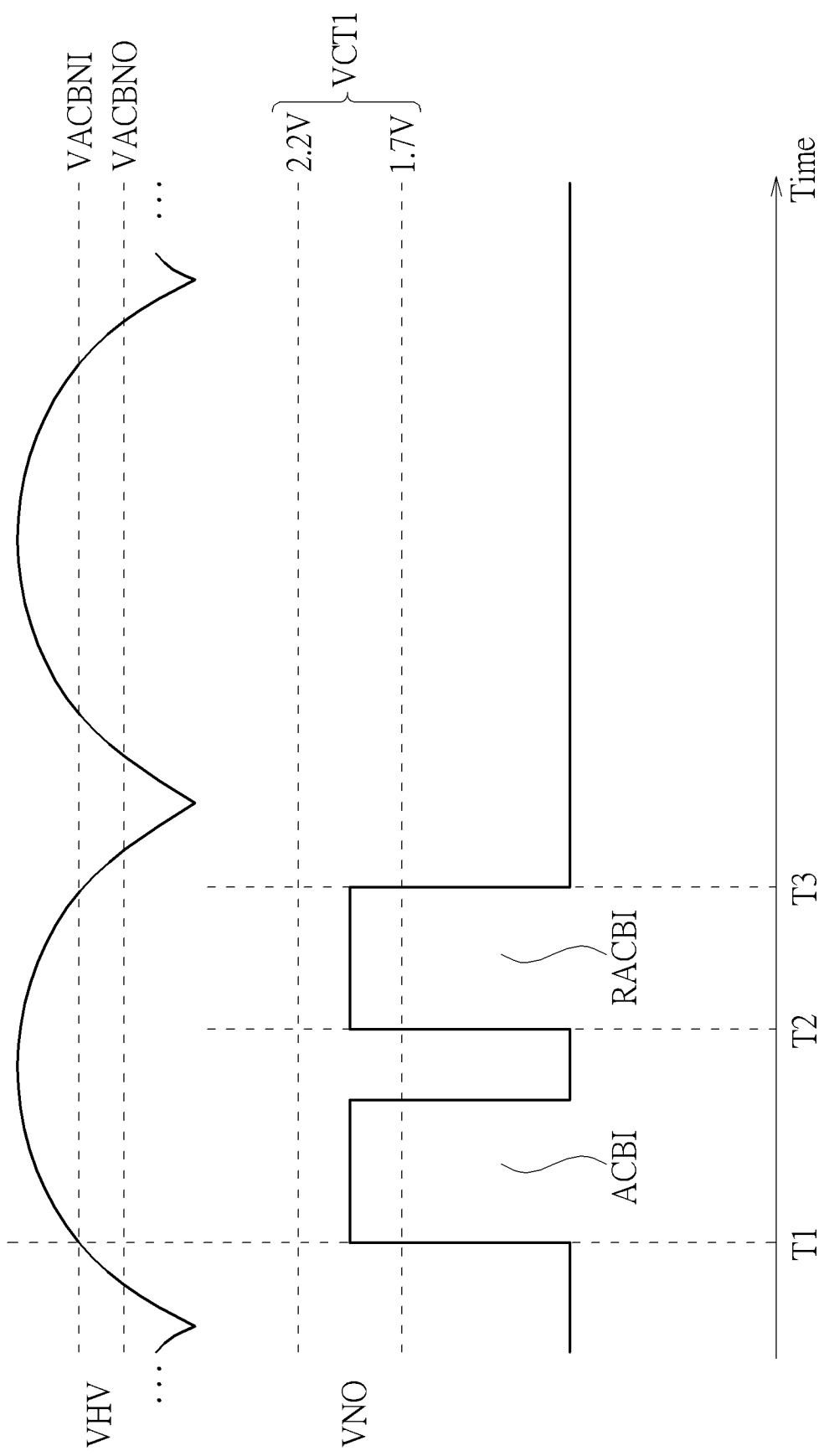
FIG. 4 is a diagram illustrating the transmitting/receiving command method being applied to start-up of the power converter.
Figure 5:
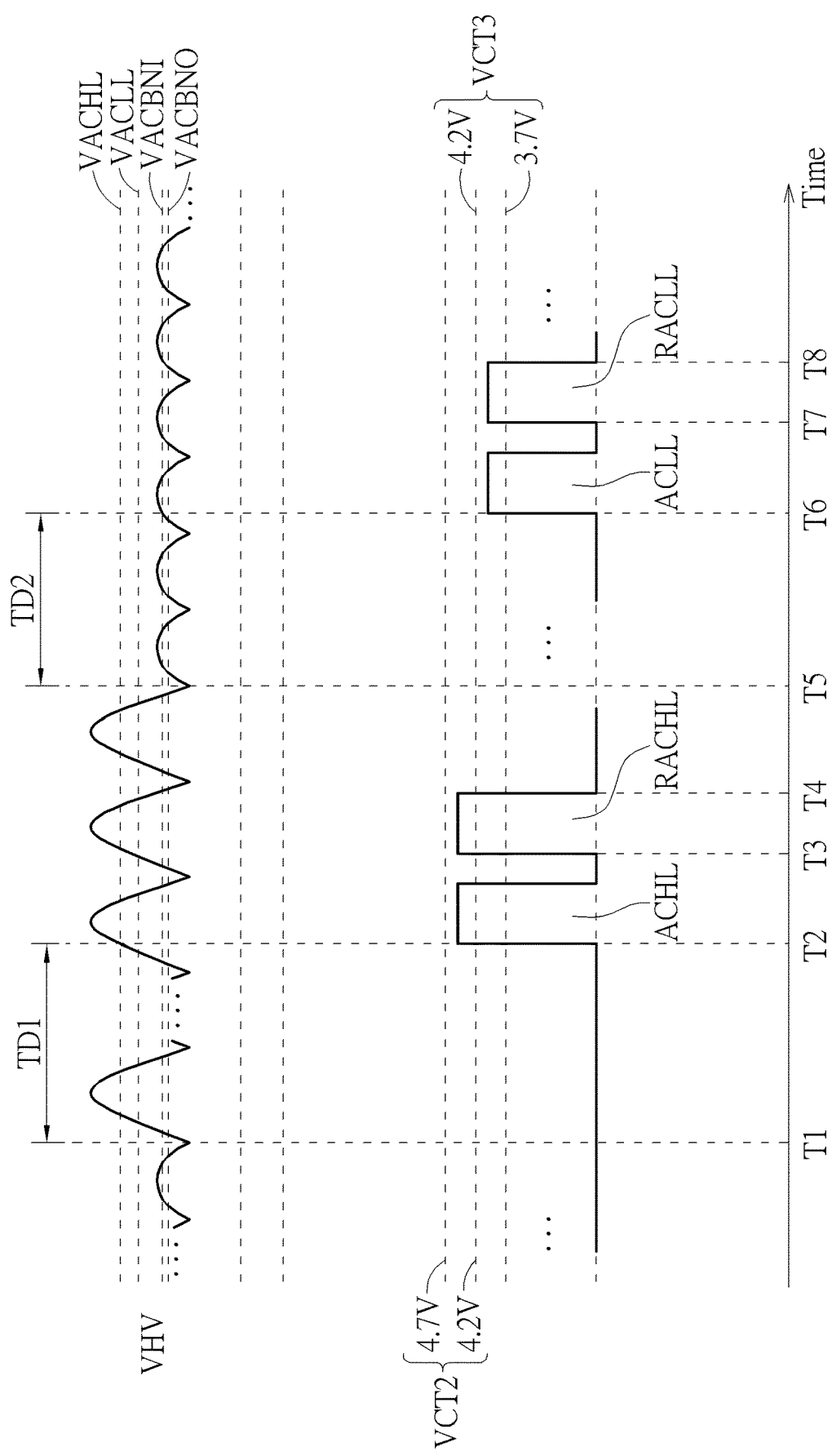
FIG. 5 is a diagram illustrating the transmitting/receiving command method being applied to AC high/low line.
Figure 6:
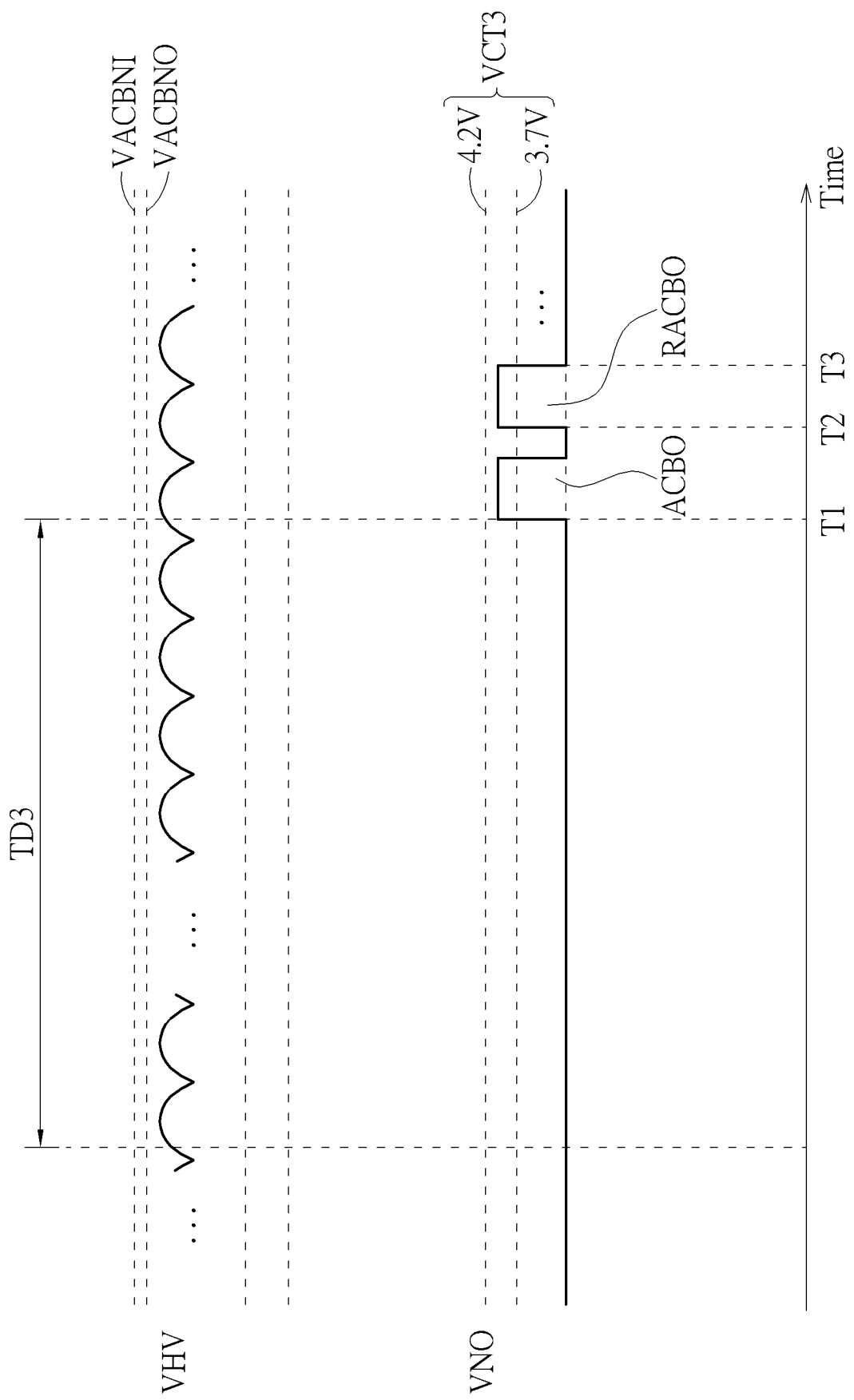
FIG. 6 is a diagram illustrating the transmitting/receiving command method being applied to turning-off of the power converter.

In addition, please refer to FIGS. 4-6. FIG. 4 is a diagram illustrating the transmitting/receiving command method being applied to start-up of the power converter 100, FIG. 5 is a diagram illustrating the transmitting/receiving command method being applied to AC high/low line, and FIG. 6 is a diagram illustrating the transmitting/receiving command method being applied to turning-off of the power converter 100. As shown in FIG. 4, when the AC source (not shown in FIG. 1) starts to provide the AC voltage VAC, the DC voltage VHV of the pin HV of the master controller 202 can be correspondingly changed with the AC voltage VAC. Therefore, when the DC voltage VHV is greater than the AC brown-in voltage VACBNI (at a time T1), corresponding circuits of the master controller 202 can generate the AC brown-in command ACBI and transmit the AC brown-in command ACBI to the slave controller 204 through the pins CTRLA, CTRLB to make the slave controller 204 control the power factor correction stage circuit 104 to start to operate according to the AC brown-in command ACBI. As shown in FIG. 4, the node voltage VNO will be correspondingly increased with the AC brown-in command ACBI to a corresponding voltage VCT1 (1.7V~2.2V), and at a time T2, the slave controller 204 transmits a return signal RACBI corresponding to the AC brown-in command ACBI to the master controller 202, wherein during enabling time (the time T2 to a time T3) of the return signal RACBI, the node voltage VNO is also increased to the corresponding voltage VCT1 with the return signal RACBI.

Because the DC voltage VHV can be correspondingly changed with the AC voltage VAC, when the AC voltage VAC is increased, the DC voltage VHV is also correspondingly increased, and when the AC voltage VAC is decreased, the DC voltage VHV is also correspondingly decreased. Therefore, as shown in FIG. 5, after a time T1, the DC voltage VHV starts to cross an AC high line reference voltage VACHL, so corresponding circuits of the master controller 202 can generate the AC high line command ACHL at a time T2 and transmit the AC high line command ACHL to the slave controller 204 through the pins CTRLA, CTRLB to make the slave controller 204 control the power factor correction stage circuit 104 to start to operate according to the AC high line command ACHL, wherein a delay time TD1 exists between the time T1 and the time T2. As shown in FIG. 5, the node voltage VNO will be correspondingly increased with the AC high line command ACHL to a corresponding voltage corresponding voltage VCT2 (4.2V~4.7V), and at a time T3, the slave controller 204 transmits a return signal RACHL corresponding to the AC high line command ACHL to the master controller 202, wherein during enabling time (the time T3 to a time T4) of the return signal RACHL, the node voltage VNO is also increased to the corresponding voltage VCT2 with the return signal RACHL. As shown in FIG. 5, after a time T5, the DC voltage VHV starts to be less than an AC low line reference voltage VACLL, so corresponding circuits of the master controller 202 can generate the AC low line command ACLL at a time T6 and transmit the AC low line command ACLL to the slave controller 204 through the pins CTRLA, CTRLB to make the slave controller 204 control the power factor correction stage circuit 104 to start to operate according to the AC low line command ACLL, wherein a delay time TD2 exists between the time T5 and the time T6, and the delay time TD1 can be equal to or different from the delay time TD2. As shown in FIG. 5, the node voltage VNO will be correspondingly increased with the AC low line command ACLL to a corresponding voltage VCT3 (3.7V~4.2V), and at a time T7, the slave controller 204 transmits a return signal RACLL corresponding to the AC low line command ACLL to the master controller 202, wherein during enabling time (the time T7 to a time T8) of the return signal RACLL, the node voltage VNO is also increased to the corresponding voltage VCT3 with the return signal RACLL.

In addition, as shown in FIG. 6, after the DC voltage VHV is less than an AC brown-out voltage VACBNO for a delay time TD3, corresponding circuits of the master controller 202 can generate the AC brown-out command ACBO and transmit the AC brown-out command ACBO to the slave controller 204 through the pins CTRLA, CTRLB to make the slave controller 204 control the power factor correction stage circuit 104 to be turned off according to the AC brown-out command ACBO. As shown in FIG. 6, the node voltage VNO will be correspondingly increased with the AC brown-out command ACBO to corresponding voltage VCT4 (2.2V~2.7V), and at a time T2, the slave controller 204 transmits a return signal RACBO corresponding to the AC brown-out command ACBO to the master controller 202, wherein during enabling time (the time T2 to a time T3) of the return signal RACBO, the node voltage VNO is also increased to the corresponding voltage VCT4 with the return signal RACBO.

To sum up, the transmitting/receiving command method makes each command of a plurality of commands transmitted between the master controller and the slave controller correspond to a predetermined voltage range, and a pin of the master controller for transmitting the plurality of commands corresponds to at least one predetermined function (e.g. the over temperature protection). Therefore, compared to the prior art, the transmitting/receiving command method simultaneously has advantages of operating easily, covering multiple commands, and the master controller and the slave controller not needing additional pin to execute the transmitting/receiving command method.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A transmitting/receiving command method applied between a master controller and a slave controller of a power converter, comprising:
   enabling the master controller and the slave controller;
   one controller of the master controller and the slave controller detecting a node voltage of a pin of the one controller;
   the one controller transmitting a first command of a plurality of first commands to another controller of the master controller and the slave controller through the pin when the node voltage is less than a predetermined voltage, wherein the predetermined voltage corresponds to over temperature protection (OTP) of the power converter, and the another controller is different from the one controller;
   the one controller detecting the node voltage again after the one controller receives a first return signal transmitted by the another controller; and
   the one controller entering a receiver state, the one controller receiving a second command of a plurality of second commands transmitted by the another controller, and the one controller detecting the node voltage again after the one controller executes the second command and transmits a second return signal to the another controller through the pin when the node voltage is greater than the predetermined voltage, wherein the second return signal corresponds to the second command.

2. The transmitting/receiving command method of claim 1, wherein the one controller enters a transmitter state, and the another controller enters a receiver state.

3. The transmitting/receiving command method of claim 1, wherein the first return signal corresponds to the first command.

4. The transmitting/receiving command method of claim 1, further comprising:
   the one controller transmitting the first command to the another controller again after the one controller does not receive the first return signal.

5. The transmitting/receiving command method of claim 1, further comprising:
   the one controller detecting the node voltage again if the one controller does not transmit the first command to the another controller through the pin when the node voltage is less than the predetermined voltage.

6. The transmitting/receiving command method of claim 1, wherein the another controller transmits the first return signal to the one controller through a pin of the another controller after the another controller executes the first command.

7. The transmitting/receiving command method of claim 1, wherein the master controller controls a pulse width modulation (PWM) stage circuit of the power converter, and the another controller controls a power factor correction (PFC) stage circuit of the power converter.

8. The transmitting/receiving command method of claim 1, wherein when the one controller is the master controller, the one controller further determines whether to execute the over temperature protection on the power converter.

9. A transmitting/receiving command method applied between a master controller and a slave controller of a power converter, comprising:
   enabling the master controller and the slave controller;
   one controller of the master controller and the slave controller detecting a node voltage of a pin of the one controller;
   the one controller transmitting a first command of a plurality of first commands to another controller of the master controller and the slave controller through the pin when the node voltage is less than a predetermined voltage, wherein each first command of the plurality of first commands corresponds to a predetermined voltage range, and the another controller is different from the one controller;
   the one controller detecting the node voltage again after the one controller receives a first return signal transmitted by the another controller; and
   the one controller entering a receiver state, the one controller receiving a second command of a plurality of second commands transmitted by the another controller, and the one controller detecting the node voltage again after the one controller executes the second command and transmits a second return signal to the another controller through the pin when the node voltage is greater than the predetermined voltage, wherein the second return signal corresponds to the second command.

10. The transmitting/receiving command method of claim 9, further comprising:
    the one controller transmitting the first command to the another controller again after the one controller does not receive the first return signal.

11. The transmitting/receiving command method of claim 9, further comprising:
    the one controller detecting the node voltage again if the one controller does not transmit the first command to the another controller through the pin when the node voltage is less than the predetermined voltage.

12. The transmitting/receiving command method of claim 9, wherein when the one controller is the master controller, the one controller further determines whether to execute the over temperature protection on the power converter.

* * * * *